(12) United States Patent
Chun et al.

(10) Patent No.: US 11,645,738 B2
(45) Date of Patent: May 9, 2023

(54) DRIVING DEEP LEARNING-BASED IMAGE DEBLURRING METHOD AND APPARATUS PERFORMING THE SAME

(71) Applicant: UNIST (ULSAN NATIONAL INSTITUTE OF SCIENCE AND TECHNOLOGY), Ulsan (KR)

(72) Inventors: Se Young Chun, Ulsan (KR); Dong Won Park, Ulsan (KR); Dong Un Kang, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 229 days.

(21) Appl. No.: 17/095,983

(22) Filed: Nov. 12, 2020

(65) Prior Publication Data

US 2022/0076386 A1 Mar. 10, 2022

(30) Foreign Application Priority Data

Sep. 9, 2020 (KR) .......................... 10-2020-0115575

(51) Int. Cl.
*G06T 5/00* (2006.01)
*G06N 3/08* (2023.01)
(Continued)

(52) U.S. Cl.
CPC ............ *G06T 5/003* (2013.01); *G06F 18/213* (2023.01); *G06F 18/214* (2023.01); *G06N 3/08* (2013.01);
(Continued)

(58) Field of Classification Search
None
See application file for complete search history.

(56) References Cited

U.S. PATENT DOCUMENTS 9,430,817 B2 * 8/2016 Schelten ................. G06T 5/003
10,289,951 B2 * 5/2019 Wang ................... G06K 9/6262
2020/0349680 A1 * 11/2020 Tao ..................... H04N 5/23267

FOREIGN PATENT DOCUMENTS

JP 2020036310 A 3/2020
JP 2020517946 A 6/2020
(Continued)

OTHER PUBLICATIONS

Uniform Motion Deblurring using Shock Filter and Convolutional Neural Network, Minso Jeong and Jechang Jeong, pp. 1-11 JBE vol. 23, No. 4, Jul. 2018 https://doi.org/10.5909/JFE.2018.23.4.484 ISSN 2287-9137.
(Continued)

*Primary Examiner* — Leon Flores
(74) *Attorney, Agent, or Firm* — George McGuire (57) ABSTRACT

An image deblurring method and an apparatus performing the same are disclosed. The image deblurring method according to an example embodiment includes receiving a blurred image, and deblurring of outputting a sharp original image based on the blurred image. The deblurring includes obtaining a second image having the same scale as that of a first image by inputting the first image to a neural network, obtaining a third image having the same scale as that of the first image by concatenating the first image and the second image, and obtaining a fourth image having the same scale as that of the first image by inputting the third image to the neural network.

14 Claims, 8 Drawing Sheets

(51) Int. Cl.
*G06V 10/40* (2022.01)
*G06F 18/213* (2023.01)
*G06F 18/214* (2023.01)

(52) U.S. Cl.
CPC .... *G06V 10/40* (2022.01); *G06T 2207/20081* (2013.01); *G06T 2207/20084* (2013.01)

(56) References Cited

FOREIGN PATENT DOCUMENTS

| KR | 1020100047885 A | 5/2010 |
| KR | 101152525 B1 | 7/2012 |
| KR | 102103770 A | 10/2019 |
| KR | 1020190114340 | 12/2019 |
| WO | 2019167884 A1 | 2/2021 |

OTHER PUBLICATIONS

Multi-Temporal Recurrent Neural Networks For Progressive Non-Uniform Single Image Deblurring With Incremental Temporal Training Dongwon Park, Dong Un Kang, Jisoo Kim Se Young Chun School of Electrical and Computer Engineering, UNIST, Republic of Korea.

\* cited by examiner

DRIVING DEEP LEARNING-BASED IMAGE DEBLURRING METHOD AND APPARATUS PERFORMING THE SAME

CROSS-REFERENCE TO RELATED APPLICATION(S)

This application claims the benefit of Korean Patent Application No. 10-2020-0115575, filed on Sep. 9, 2020, in the Korean Intellectual Property Office, the disclosure of which is incorporated herein by reference.

BACKGROUND

1. Field of the Invention

Example embodiments relate to a deep learning-based image deblurring method and an apparatus performing the same.

2. Description of the Related Art

In non-uniform deblurring of a single non-uniform image, it is a difficult problem to restore a sharp image from a blurred image without predicting unknown non-uniform blur kernels.

One of the deblurring methods is to simplify the problem by assuming uniform blur and restoring an image and blur kernels. However, the uniform blur is not accurate enough to approximate actual blur, and accordingly there are many studies that extend a blur model from uniform to non-uniform in a limited manner in comparison to a full dense matrix.

There are two methods of using a deep neural network (DNN) for deblurring. One is to explicitly estimate non-uniform blur using the DNN, and the other is to directly estimate a sharp image without estimating blur using the DNN.

Korean Patent No. 10-1152525 (hereinafter referred to as "Related Art") discloses a method for removing motion blur and an apparatus for performing the method.

SUMMARY

Aspects provide image deblurring technology having a high processing speed and high performance without causing a problem of destroying a characteristic of a high frequency region in a deblurring process.

However, a technical issue is not limited to the above-described technical issues, and other technical issues may exist.

According to an aspect, there is provided an image deblurring method including receiving a blurred image, and deblurring of outputting a sharp original image based on the blurred image. The deblurring may include obtaining a second image having the same scale as that of a first image by inputting the first image to a neural network, obtaining a third image having the same scale as that of the first image by concatenating the first image and the second image, and obtaining a fourth image having the same scale as that of the first image by inputting the third image to the neural network.

The image deblurring method may further include obtaining a first feature map and a second feature map by inputting the first image to the neural network, and obtaining a third feature map and a fourth feature map by inputting the first feature map and the second feature map to the neural network.

The neural network may be a recursive neural network having a structure including a plurality of encoders and a plurality of decoders.

Each of the plurality of encoders and the plurality of decoders may include residual blocks and feature extraction layers of different channels.

According to another aspect, there is provided an image deblurring apparatus including a memory including instructions, and a processor configured to execute the instructions. When the instructions are executed by the processor, the processor may be configured to obtain a second image having the same scale as that of a first image by inputting the first image to a neural network, obtain a third image having the same scale as that of the first image by concatenating the first image and the second image, and obtain a fourth image having the same scale as that of the first image by inputting the third image to the neural network.

The processor may be configured to obtain a first feature map and a second feature map by inputting the first image to the neural network, and obtain a third feature map and a fourth feature map by inputting the first feature map and the second feature map to the neural network.

The neural network may be a recursive neural network having a structure including a plurality of encoders and a plurality of decoders.

Each of the plurality of encoders and the plurality of decoders may include residual blocks and feature extraction layers of different channels.

According to still another aspect, there is provided a neural network training method including obtaining a second image by inputting a first image to a neural network, modifying a parameter of the neural network based on a first correct answer label and the second image, obtaining a third image by inputting the first image and the second image to the neural network, and modifying a parameter of the neural network based on a second correct answer label and the third image.

The first image may be an image generated by concatenating a plurality of consecutively photographed images.

The first correct answer label may be an image generated by concatenating fewer images than the first image.

The second correct answer label may be an image generated by concatenating fewer images than the first correct answer label.

According to still another aspect, there is provided a neural network training apparatus including a memory including instructions, and a processor configured to execute the instructions. When the instructions are executed by the processor, the processor may be configured to obtain a second image by inputting a first image to a neural network, modify a parameter of the neural network based on a first correct answer label and the second image, obtain a third image by inputting the first image and the second image to the neural network, and modify a parameter of the neural network based on a second correct answer label and the third image.

The first image may be an image generated by concatenating a plurality of consecutively photographed images.

The first correct answer label may be an image generated by concatenating fewer images than the first image.

The second correct answer label may be an image generated by concatenating fewer images than the first correct answer label.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. The scope of the right, however, should not be construed as limited to the example embodiments set forth herein. Various modifications may be made to the example embodiments. Here, examples are not construed as limited to the example embodiments and should be understood to include all changes, equivalents, and replacements within the idea and the technical scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by those skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the components in the drawings, it should be noted that the same components will be designated by the same reference numerals, wherever possible, even though they are shown in different drawings. Also, in the description of example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to", "coupled to", or "linked to" another component, one component may be "connected to", "coupled to", or "linked to" another component via a further component although one component may be directly connected to or directly linked to another component.

A component included in one example embodiment and another component including a function in common with the component will be described using the same designation in other example embodiments. Unless otherwise expressed, a description in one example embodiment may be applied to other example embodiments, and a detailed description will be omitted in an overlapping range.

Figure 1A:
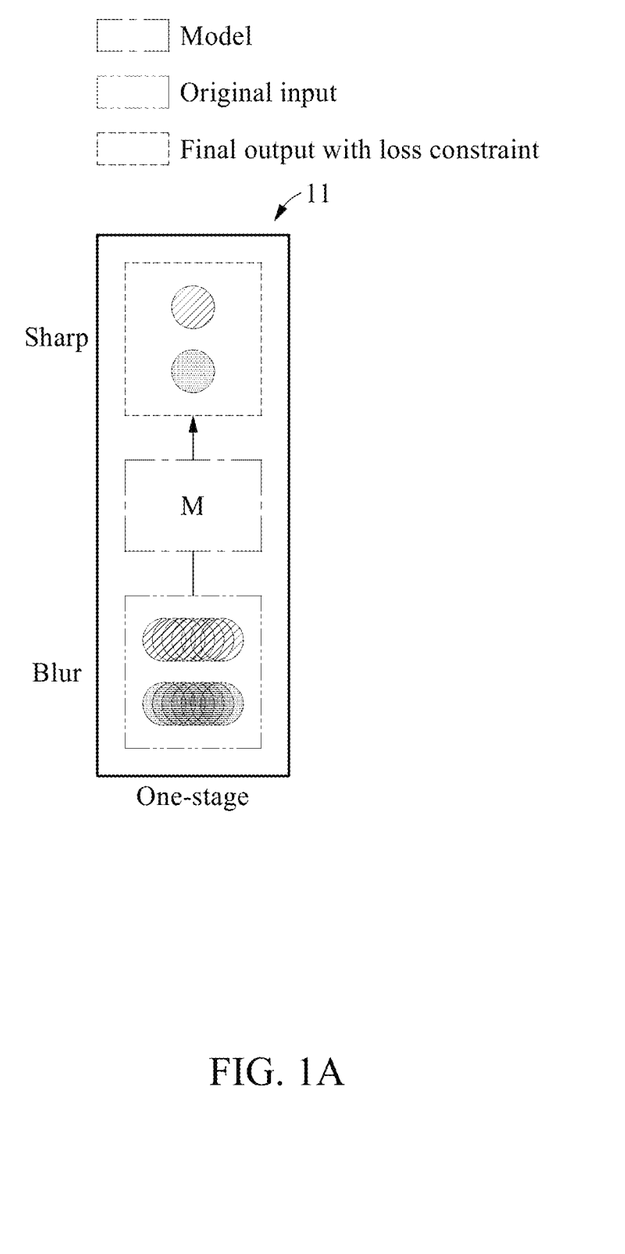
FIGS. 1A to 1C illustrate an image deblurring method according to related art.
Figure 1B:
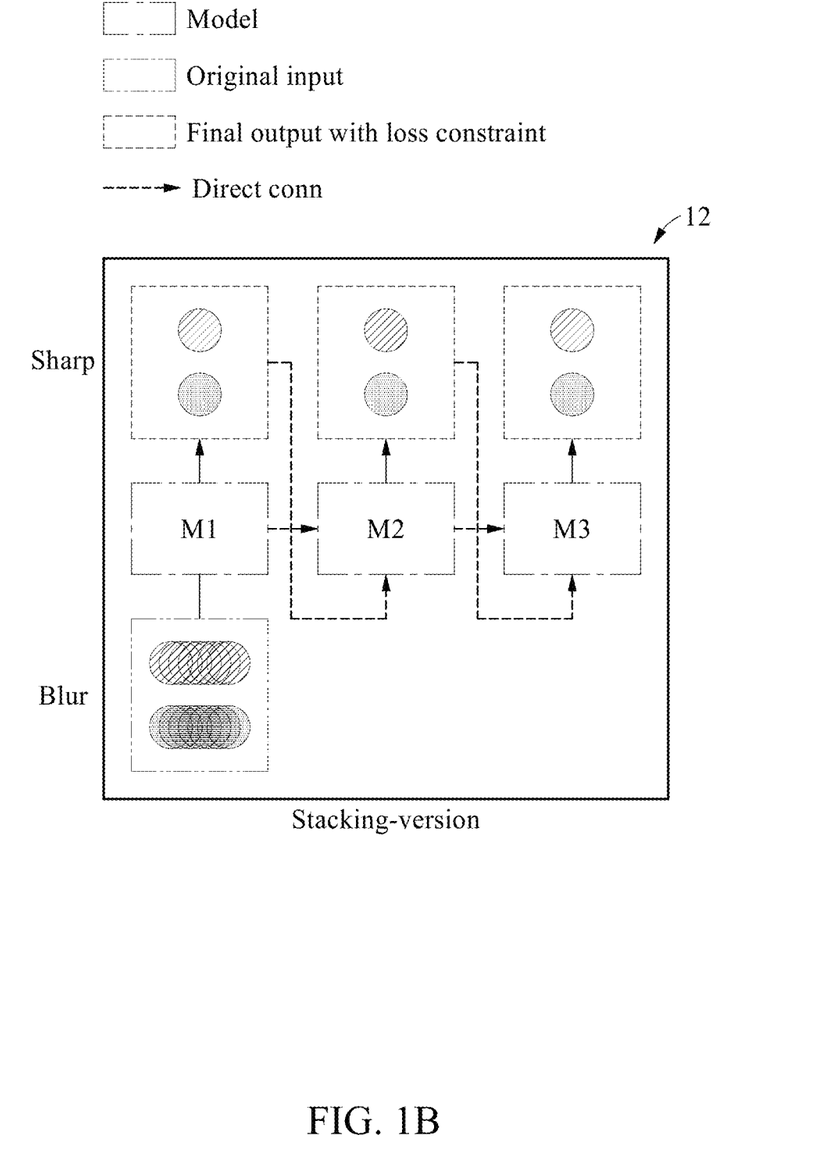
Figure 1C:
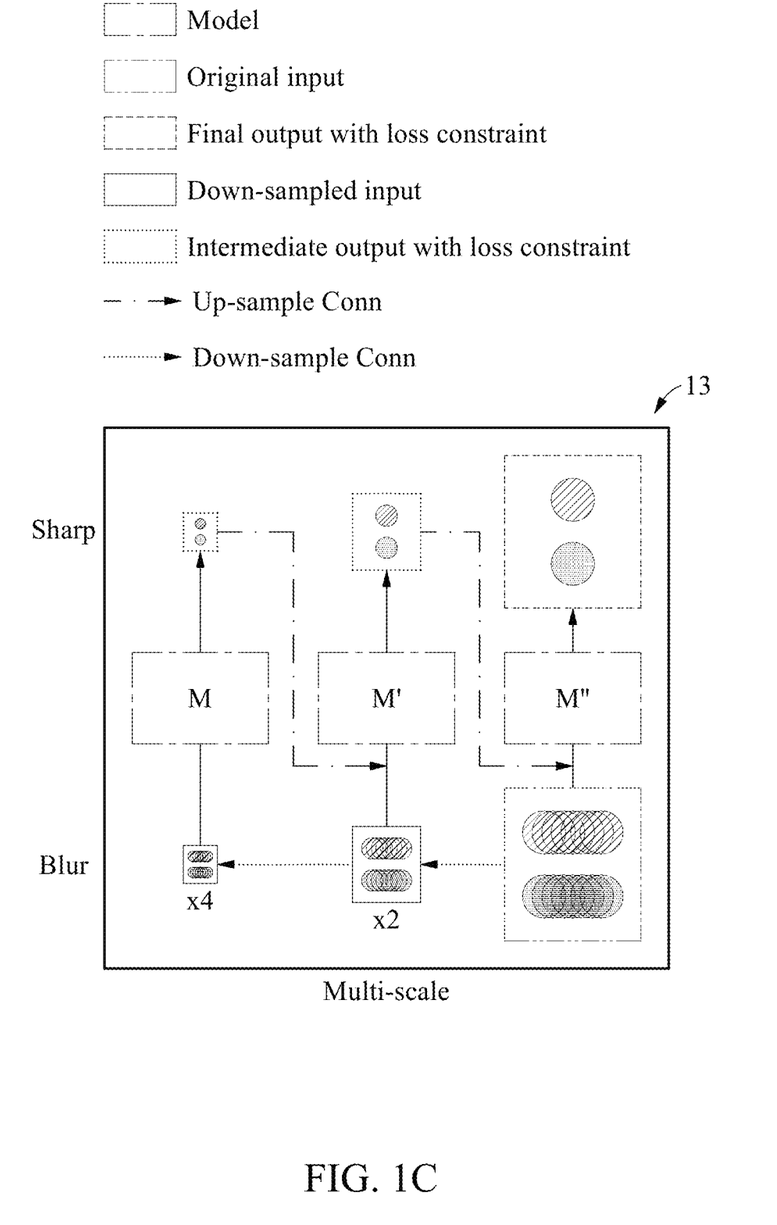

FIGS. 1A to 1C illustrate an image deblurring method according to related art.

FIG. 1A illustrates a one-stage (OS) deblurring method 11. The OS deblurring method 11 may be a method for restoring an original image from a blurred image of a spatial scale.

The OS deblurring method 11 may supervise a deep neural network (DNN) model M to output a sharp original image at a time at an original high spatial scale of the original image.

FIG. 1B illustrates a stack-version (SV) deblurring method 12. The SV deblurring method 12 may use independent DNN models M1 to M3 several times. In order to restore a sharp original image, the SV deblurring method 12 may repeatedly input an output image to the DNN models M1 to M3 in a sequential order.

The SV deblurring method 12 may use a plurality of independent models. Each model may be trained to independently restore a sharp original image at an original high spatial scale of the original image. The SV deblurring method 12 may have a different input for each model, and an output of a previous model may be inputted to a different model.

FIG. 1C illustrates a multi-scale (MS) deblurring method 13. The MS deblurring method 13 may restore a sharp original image by using images down-sampled at different spatial scales.

The MS deblurring method 13 may restore an image down-sampled at a lowest scale by using the DNN model M, and then may sequentially restore the image to an image of a higher spatial scale. The MS deblurring method 13 may have a disadvantage in that edge information of an image is lost because the image is reduced to restore a sharp original image.

Figure 2:
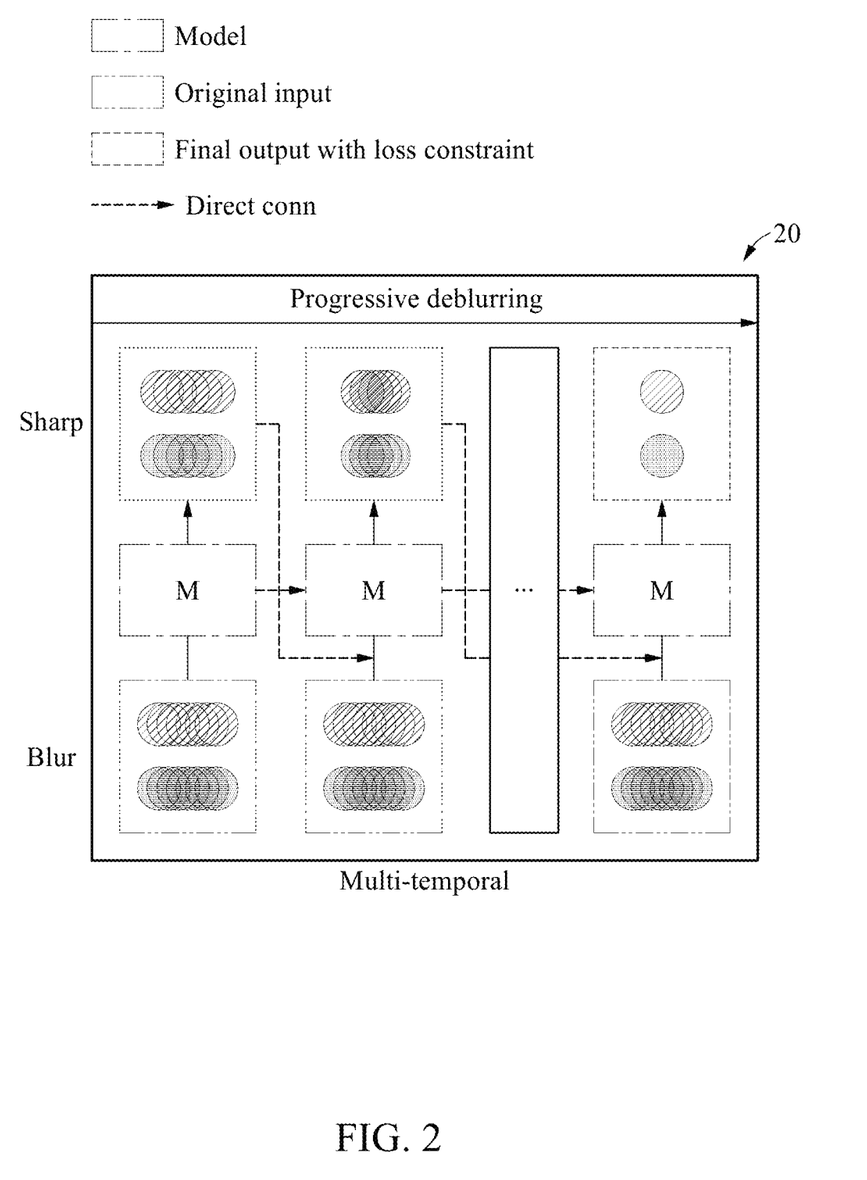
FIG. 2 illustrates an image deblurring method according to an example embodiment.

FIG. 2 illustrates an image deblurring method according to an example embodiment.

A deblurring method 20 may restore a blurred image to a sharp original image at a spatial scale of the original image. The deblurring method 20 may progressively deblur the blurred image at the original spatial scale without down-sampling the blurred image.

The deblurring method 20 may finally restore the sharp original image by repeatedly using the DNN model M that restores a relatively small amount of blur. The deblurring method 20 may progressively restore the sharp original image by transferring a result obtained in each step of a progressive deblurring process to a next step.

The deblurring method 20 may perform deblurring by using a multi-temporal recurrent neural network (MT-RNN). The MT-RNN may use a recurrent feature map for transferring the result obtained in each step to the next step.

The deblurring method 20 may provide higher performance by using a parameter that shares the same spatial scale.

The MT-RNN may be trained through incremental temporal training. For example, the MT-RNN may be trained to perform stepwise deblurring.

Training data for training of the MT-RNN may be generated through a temporal data augmentation method.

Figure 3:
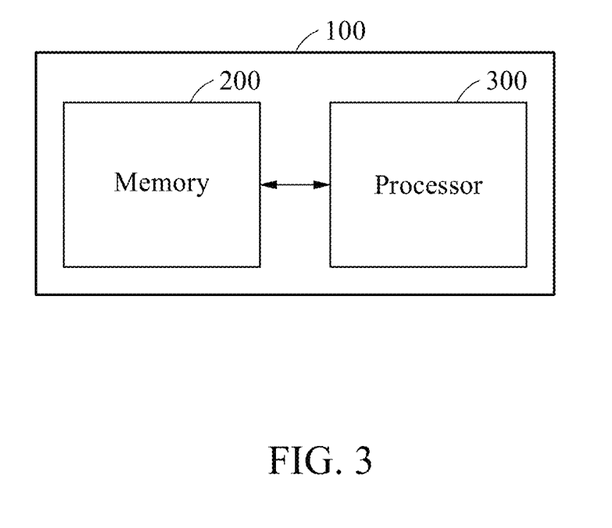
FIG. 3 schematically illustrates an apparatus for performing the image deblurring method illustrated in FIG. 2.

FIG. 3 schematically illustrates an apparatus for performing the image deblurring method illustrated in FIG. 2.

An apparatus 100 for performing the deblurring method 20 may include a memory 200 and a processor 300.

The processor 300 may execute a computer-readable code (for example, software) stored in the memory 200 and instructions induced by the processor 300.

The processor 300 may be a data processing device implemented in hardware having a circuit with a physical structure for executing desired operations. For example, the desired operations may include a code or instructions included in a program.

For example, the data processing device implemented in hardware may include a microprocessor, a central processing unit, a processor core, a multi-core processor, a multiprocessor, an application-specific integrated circuit (ASIC), and a field programmable gate array (FPGA).

The memory 200 may store instructions (or programs) executable by the processor 300. For example, the instructions may include instructions for executing an operation of the processor 300 and/or an operation of each component of the processor 200.

The memory 200 may be implemented as a volatile memory device or a nonvolatile memory device.

The volatile memory device may be implemented as dynamic random access memory (DRAM), static random access memory (SRAM), thyristor RAM (T-RAM), zero capacitor RAM (Z-RAM), or twin transistor RAM (TTRAM).

The nonvolatile memory device may be implemented as electrically erasable programmable read-only memory (EEPROM), flash memory, magnetic RAM (MRAM), spin-transfer torque (STT)—MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, molecular electronic memory device, or insulator resistance change memory.

The processor 300 may deblur a blurred image at an original spatial scale by using the MT-RNN.

The processor 300 may train the MT-RNN to perform the progressive deblurring method 20. The processor 300 may generate training data for training the MT-RNN through a temporal data augmentation method.

Hereinafter, a training data generation method, an MT-RNN training method, and an operation of the MT-RNN will be described in detail.

Figure 4:
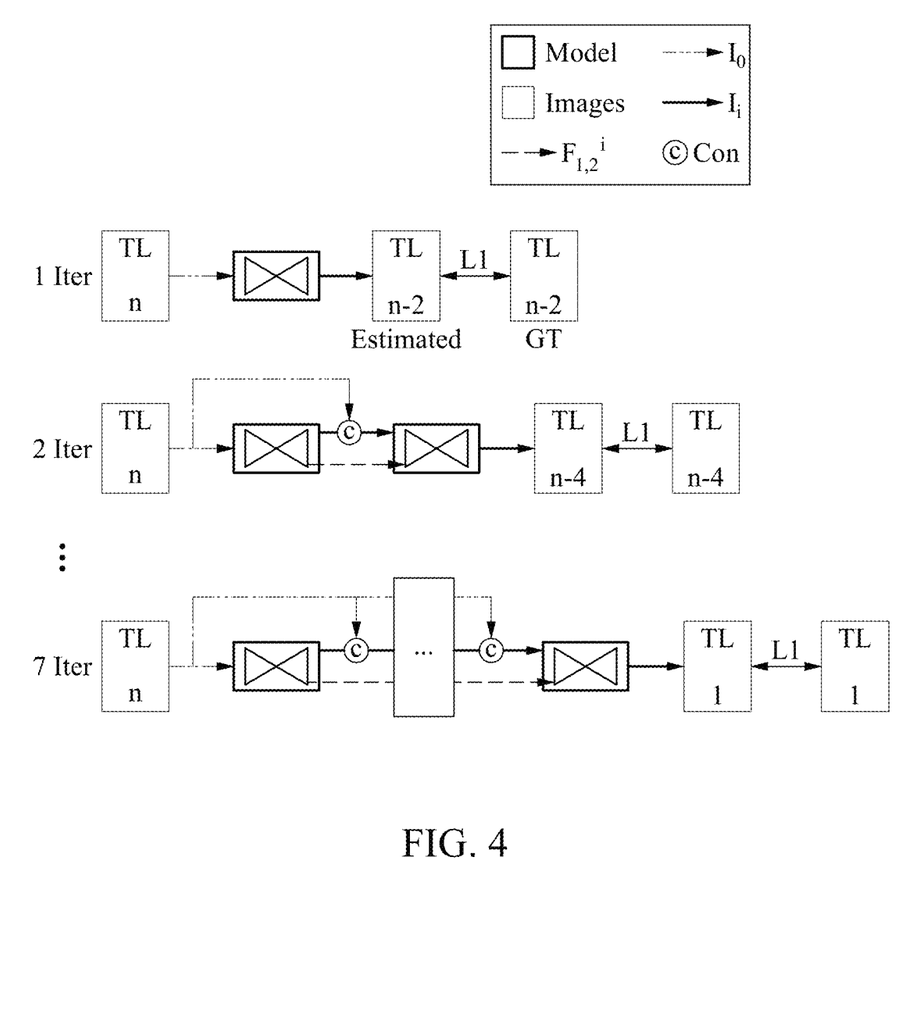
FIG. 4 illustrates a method for training a neural network for performing the image deblurring method illustrated in FIG. 2.

FIG. 4 illustrates a method for training a neural network for performing the image deblurring method illustrated in FIG. 2.

The processor 300 may generate non-uniform deblurring datasets by integrating a plurality of sharp images. For example, the processor 300 may generate non-uniform deblurring data based on an average of a plurality of sharp images. Here, the plurality of sharp images may be images photographed by a high-speed camera.

The processor 300 may generate a blurred image (y $\in R^{M \times N}$) based on a may be continuous image (x $\in R^{M \times N}$). The generated blurred image (represented by Equation 1.

[Equation 1]

$$y = g\left(\frac{1}{T}\int_{t=0}^{T} x(t)\,dt\right) \approx g\left(\frac{1}{n}\sum_{i=0}^{n} x[i]\right)$$

T and x(t) may refer to an exposure time at time t in a continuous time domain, and a sharp image, respectively. For example, the exposure time T may refer to a speed at which a shutter of the high-speed camera photographing an image is pressed. x[i] may refer to an i-th sharp image in a discontinuous domain, and n may refer to the number of sharp images. g may refer to a camera response function (CRF).

That is, the processor 300 may generate a blurred image by using n sharp images. Hereinafter, for ease of description, the blurred image generated by using n sharp images may be referred to as a temporal level n (TL n).

The processor 300 may generate a training data set including a ground truth TL 1 and blurred images TL n generated with different number of frames. Here, the TL 1 may be used as a correct answer label of a finally restored image of the MT-RNN, and the generated blurred images TL n may be used as a correct answer label of an intermediate process of the MT-RNN.

The processor 300 may train the MT-RNN through incremental temporal training. The processor 300 may train the MT-RNN through a curriculum learning approach based on a data set including the correct answer label of the intermediate process.

In a first iteration 1 Iter, the processor 300 may train the MT-RNN based on an L1 loss function between an estimated image TL n-2 outputted by inputting the TL n to the MT-RNN, and a correct answer label TL n-2.

In a next iteration, the processor 300 may train the MT-RNN based on an L1 loss function between an image outputted in a previous iteration and a correct answer label corresponding to an image outputted by inputting the TL n to the MT-RNN.

The processor 300 may iterate a training process until a finally outputted image becomes a final correct answer label TL 1.

The MT-RNN may use the same parameter, and may be independently trained with respect to all iterations. Thus, the processor 300 may train the MT-RNN with limited memory, and may reduce a network size of the MT-RNN without sharing a parameter.

Figure 5:
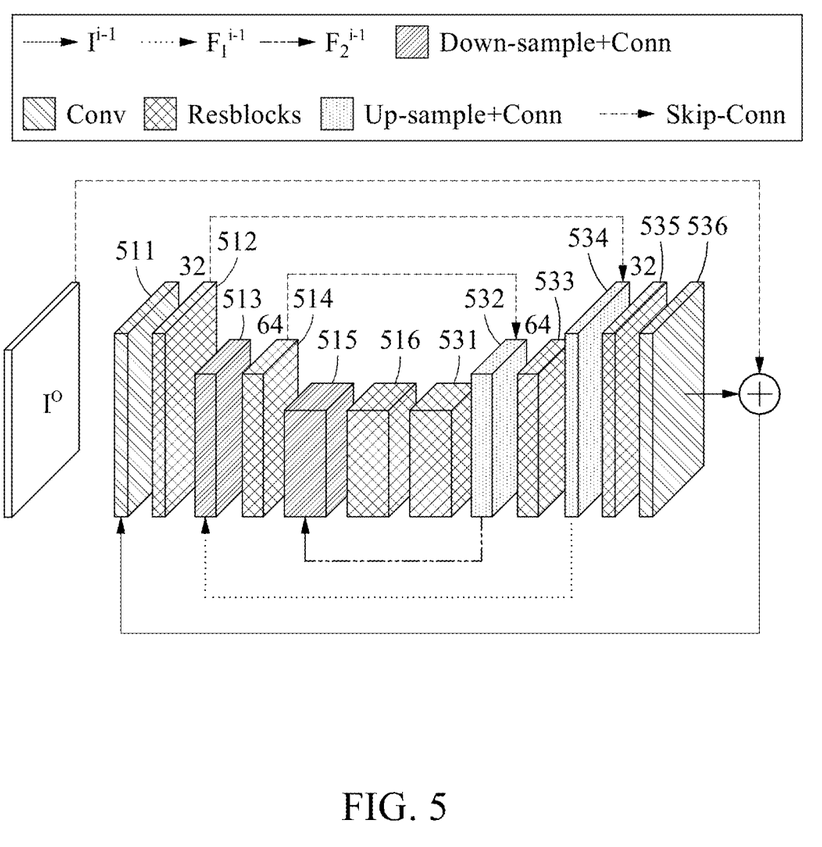
FIG. 5 illustrates a neural network for performing the image deblurring method illustrated in FIG. 2.

FIG. 5 illustrates a neural network for performing the image deblurring method illustrated in FIG. 2.

The MT-RNN may perform deblurring by using the recurrent feature map. The MT-RNN may be represented by Equation 2.

$$\{\hat{I}^i, F_1^i, F_2^i\} = DNN(\hat{I}^{i-1}, I^0, F_1^{i-1}, F_2^{i-1}; \theta) \quad \text{[Equation 2]}$$

i may refer to the number of iterations. $F_1^{i-1}$ and $F_2^{i-1}$ may refer to feature maps recursive in an i-1th iteration. $I^0$ may refer to a blurred image used as an input of a network. $\hat{I}^{i-1}$ and $\hat{I}^i$ may refer to an image predicted in the i-1th iteration and an image predicted in the i-th iteration, respectively $F_1^i$ and $F_2^i$ may refer to recursive feature maps generated in the i-th iteration. θ may refer to parameters of the network.

The MT-RNN may have an encoder-decoder structure. Upper, middle, and lower encoders and decoders of the encoder-decoder structure may include residual blocks and feature extraction layers of 32, 64, and 128 channels, respectively.

For ease of description, respective layers of the encoder may be referred to as a first convolution layer 511, a first residual block 512, a first down-sampling convolution layer 513, a second residual block 514, a second down-sampling convolution layer 515, and a third residual block 516. Respective layers of the decoder may be referred to as a fourth residual block 531, a first up-sampling convolution layer 532, a fifth residual block 533, a second up-sampling convolution layer 534, a sixth residual block 535, and a second convolution layer 536. Here, the first up-sampling convolution layer 532 and the second up-sampling convolution layer 534 may be feature extraction layers.

In the i-th iteration of the MT-RNN, a concatenation of the input image $I^0$ and the image $\hat{I}^{i-1}$ predicted in the i-1th iteration may be inputted. In addition, the recursive feature maps $F_1^{i-1}$ and $F_2^{i-1}$ respectively extracted from the first up-sampling convolution layer 532 and second up-sampling convolution layer 534 in the i-1 th iteration may be inputted to the first down-sampling convolution layer 513 and the second down-sampling convolution layer 515, respectively.

The recursive feature maps $F_1^i$ and $F_2^i$ extracted from the first residual block 512 and the second residual block 514 in the i-th iteration of the MT-RNN may be supplied to the first down-sampling convolution layer 513 and the second down-sampling convolution layer 515, respectively. That is, the first down-sampling convolution layer 513 and the second down-sampling convolution layer 515 may be feature skip connection layers.

The recursive feature map may $F_i^{-1}$ be supplied from a last residual block of each decoder, and may be concatenated with a feature map of a previous encoder in the feature extraction layer, as shown in Equation 3.

$$F_{enc}^i = Cat(F^{i-1}, f^i) \quad \text{[Equation 3]}$$

Here, $f^i$ may be a feature map in the i-th iteration of the previous encoder.

The estimated image $\hat{I}^{i-1}$ may be concatenated with the input image $I^0$, as shown in Equation 4.

$$I_{cat}^i = Cat(\hat{I}^{i-1}, I^0) \quad \text{[Equation 4]}$$

$F_{enc}^i$ and $I_{cat}^i$ may be used as inputs to the encoder.

The MT-RNN may use convolutional long short-term memory (LSTM) to transfer an intermediate feature map to the next iteration in an RNN cell, or may use the recursive feature map $F^{i-1}$ in a similar manner with using a hidden state in a cell.

The processor 300 may progressively perform deblurring by using the MT-RNN that operates in the above-described manner.

Figure 6:
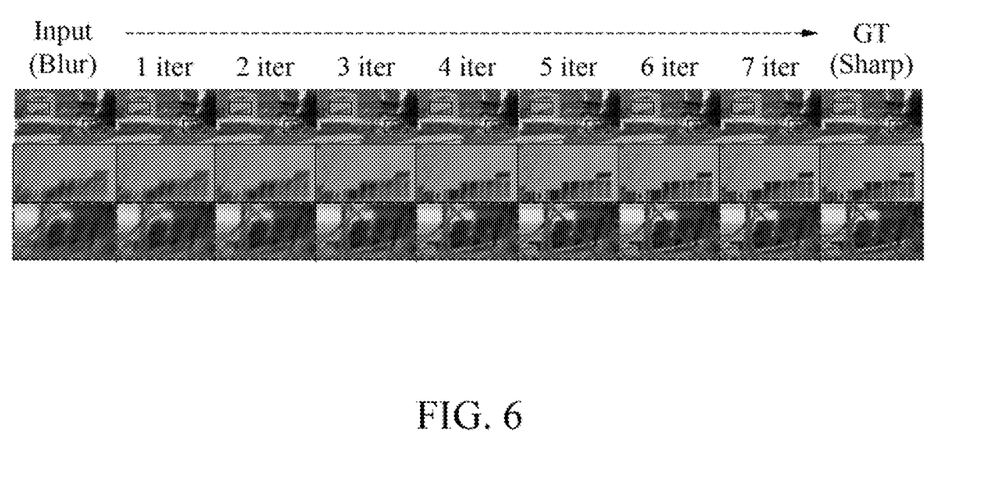
FIG. 6 illustrates an image deblurred through the image deblurring method illustrated in FIG. 2.

FIG. 6 illustrates an image deblurred through the image deblurring method illustrated in FIG. 2.

FIG. 6 illustrates a result of performing the deblurring method 20 by using the MT-RNN. The number of iterations of the MT-RNN may affect deblurring performance.

FIG. 6 illustrates a result of performing six iterations. From the result, it can be seen that deblurring is performed with high performance.

The method according to the example embodiments may be implemented in the form of a program instruction that may be executed through various computer mechanisms, thereby being recorded in a computer-readable medium. The computer-readable medium may include program instructions, data files, data structures, and the like, independently or in combination thereof. The program instructions recorded in the medium may be specially designed and configured for the example embodiments, or may be known to those skilled in the art of computer software so as to be used. An example of the computer-readable medium includes a hard disk, a magnetic media such as a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the example embodiments, and vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be split over network coupled computer systems so that the software is stored and executed in a split fashion. The software and data may be stored by one or more computer readable recording mediums.

Although the above example embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other example embodiments, and equivalents to the claims are also within the scope of the following claims.

The present application was supported by the Ministry of Education, Ministry of Trade, Industry & Energy and Ministry of Health & Welfare, under the programs listed below.

[Project No.] NRF-2017R1D1A1B05035810

[Name of Ministry] Ministry of Education, Republic of Korea

[Research Management Institute] National Research Foundation of Korea(NRF)

[Name of Program] Basic Science Research Program

[Name of Project] Robust motion corrected TOF PET joint estimation of activity, attenuation and nonrigid motion considering inter-/intra-gate motion

[Lead Organization] UNIST

[Research Period] Mar. 1, 2020-Feb. 28, 2021

[Project No.] 10077533

[Name of Ministry] Ministry of Trade, Industry & Energy (MOTIE, Korea), Republic of Korea

[Research Management Institute] Korea Evaluation Institute of Industrial Technology (KEIT)

[Name of Program] Technology Innovation Program or Industrial Strategic Technology Development Program

[Name of Project] Development of robotic manipulation algorithm for grasping/assembling with the machine learning using visual and tactile sensing information
[Lead Organization] UNIST
[Research Period] Jan. 1, 2020-Dec. 31, 2020
[Project No.] HI18C0316
[Name of Ministry] Ministry of Health & Welfare, Republic of Korea
[Research Management Institute] Korea Health Industry Development Institute (KHIDI)
[Name of Program] Korea Health Technology R&D Project
[Name of Project] Development of Artificial Intelligence Learning Center and Pathologic Decision Support System
[Lead Organization] UNIST
[Research Period] Jan. 1, 2019-Dec. 31, 2019

What is claimed is:

1. An image deblurring method comprising:
receiving a blurred image; and
deblurring the blurred image to output a sharp original image based on the blurred image, wherein the deblurring comprises:
in the previous iteration, obtaining a second image having the same scale as that of a first image by inputting the first image to a neural network;
obtaining a third image having the same scale as that of the first image by concatenating the first image and the second image; and
in the current iteration, obtaining a fourth image having the same scale as that of the first image by inputting the third image to the neural network.

2. The image deblurring method of claim 1, further comprising:
in the previous iteration, obtaining a first feature map and a second feature map by inputting the first image to the neural network; and
in the current iteration, obtaining a third feature map and a fourth feature map that are different from the first feature map and the second feature map by inputting the first feature map and the second feature map to the neural network.

3. The image deblurring method of claim 1, wherein the neural network is a recursive neural network having a structure comprising a plurality of encoders and a plurality of decoders.

4. The image deblurring method of claim 3, wherein each of the plurality of encoders and the plurality of decoders comprises residual blocks and feature extraction layers of different channels.

5. An image deblurring apparatus comprising:
a memory comprising instructions; and
a processor configured to execute the instructions,
wherein, when the instructions are executed by the processor, the processor is configured to:
in the previous iteration, obtain a second image having the same scale as that of a first image by inputting the first image to a neural network;
obtain a third image having the same scale as that of the first image by concatenating the first image and the second image; and
in the current iteration, obtain a fourth image having the same scale as that of the first image by inputting the third image to the neural network.

6. The image deblurring apparatus of claim 5, wherein the processor is configured to:
in the previous iteration, obtain a first feature map and a second feature map by inputting the first image to the neural network; and
in the current iteration, obtain a third feature map and a fourth feature map that are different from the first feature map and the second feature map by inputting the first feature map and the second feature map to the neural network.

7. The image deblurring apparatus of claim 5, wherein the neural network is a recursive neural network having a structure comprising a plurality of encoders and a plurality of decoders.

8. The image deblurring apparatus of claim 7, wherein each of the plurality of encoders and the plurality of decoders comprises residual blocks and feature extraction layers of different channels.

9. A neural network training method comprising:
obtaining a second image by inputting a first image to a neural network;
modifying a parameter of the neural network based on a first correct answer label and the second image;
obtaining a third image by inputting the first image and the second image to the neural network; and
modifying a parameter of the neural network based on a second correct answer label and the third image,
wherein the first correct answer label is an image generated by concatenating fewer images than the first image.

10. The neural network training method of claim 9, wherein the first image is an image generated by concatenating a plurality of consecutively photographed images.

11. The neural network training method of claim 10, wherein the second correct answer label is an image generated by concatenating fewer images than the first correct answer label.

12. A neural network training apparatus comprising:
a memory comprising instructions; and
a processor configured to execute the instructions,
wherein, when the instructions are executed by the processor, the processor is configured to:
obtain a second image by inputting a first image to a neural network;
modify a parameter of the neural network based on a first correct answer label and the second image;
obtain a third image by inputting the first image and the second image to the neural network; and
modify a parameter of the neural network based on a second correct answer label and the third image,
wherein the first correct answer label is an image generated by concatenating fewer images than the first image.

13. The neural network training apparatus of claim 12, wherein the first image is an image generated by concatenating a plurality of consecutively photographed images.

14. The neural network training apparatus of claim 13, wherein the second correct answer label is an image generated by concatenating fewer images than the first correct answer label.

* * * * *